United States Patent
Damaraju et al.

(10) Patent No.: US 11,535,180 B2
(45) Date of Patent: Dec. 27, 2022

(54) UNIFIED AUTOMOTIVE THERMAL MANAGEMENT NETWORK

(71) Applicant: Woven Planet North America, Inc., Los Altos, CA (US)

(72) Inventors: Srinivasa Rao Damaraju, Fremont, CA (US); Paridhi Anang Desai, Redwood City, CA (US); Steven Son Khau, Belmont, CA (US); Marco Antonio Marroquín, San Mateo, CA (US); Azhar Kamal Meyer, Pacifica, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 539 days.

(21) Appl. No.: 16/586,906

(22) Filed: Sep. 28, 2019

(65) Prior Publication Data
US 2021/0094489 A1    Apr. 1, 2021

(51) Int. Cl.
| | | |
|---|---|---|
| *G06F 7/00* | (2006.01) | |
| *B60R 16/023* | (2006.01) | |
| *G06F 1/20* | (2006.01) | |
| *B60H 1/03* | (2006.01) | |
| *B60H 1/22* | (2006.01) | |

(52) U.S. Cl.
CPC ......... *B60R 16/0232* (2013.01); *B60H 1/03* (2013.01); *G06F 1/206* (2013.01); *B60H 2001/2253* (2013.01)

(58) Field of Classification Search
CPC ............... B60R 16/0232; B60H 1/03; B60H 2001/2253; G06F 1/206
USPC ............................................. 701/36
See application file for complete search history.

(56) References Cited

U.S. PATENT DOCUMENTS

| | | | | |
|---|---|---|---|---|
| 2008/0224663 | A1* | 9/2008 | Mack | B60W 10/30 320/132 |
| 2013/0269911 | A1* | 10/2013 | Carpenter | B60H 1/004 165/104.19 |
| 2018/0162377 | A1* | 6/2018 | Colavincenzo | B60K 6/26 |
| 2018/0244262 | A1* | 8/2018 | Ruybal | B60K 6/48 |

\* cited by examiner

*Primary Examiner* — Davis D Hwu
(74) *Attorney, Agent, or Firm* — Christopher G. Darrow; Darrow Mustafa PC

(57) ABSTRACT

In one embodiment, a method includes, by a computing system of a vehicle, determining a first temperature of a control unit of the vehicle, wherein the control unit and one or more components of the vehicle are interconnected through a thermal network, determining a thermal objective for the control unit based on the first temperature of the control unit, selecting, based on the thermal objective for the control unit, at least a first component from the one or more components, and sending one or more signals to one or more actuators within the thermal network to enable a heat-transfer fluid to flow between (1) a first portion of the thermal network thermally coupled to the control unit and (2) a second portion of the thermal network thermally coupled to the selected first component.

20 Claims, 10 Drawing Sheets

UNIFIED AUTOMOTIVE THERMAL MANAGEMENT NETWORK

BACKGROUND

Autonomous or semi-autonomous vehicles offer the possibility of increased traffic efficiency, improved passenger safety, and reduced transportation costs. Such vehicles use a combination of sensors and computing technology to reduce or obviate the need for a human driver. By combining sensors, computing units, and communication equipment, autonomous or semi-autonomous vehicles contain numerous electronic components which dissipate heat and have different temperature tolerances, and therefore require thermal management solutions to assure reliability and continuous operation of these components.

DESCRIPTION OF EXAMPLE EMBODIMENTS

Figure 1:
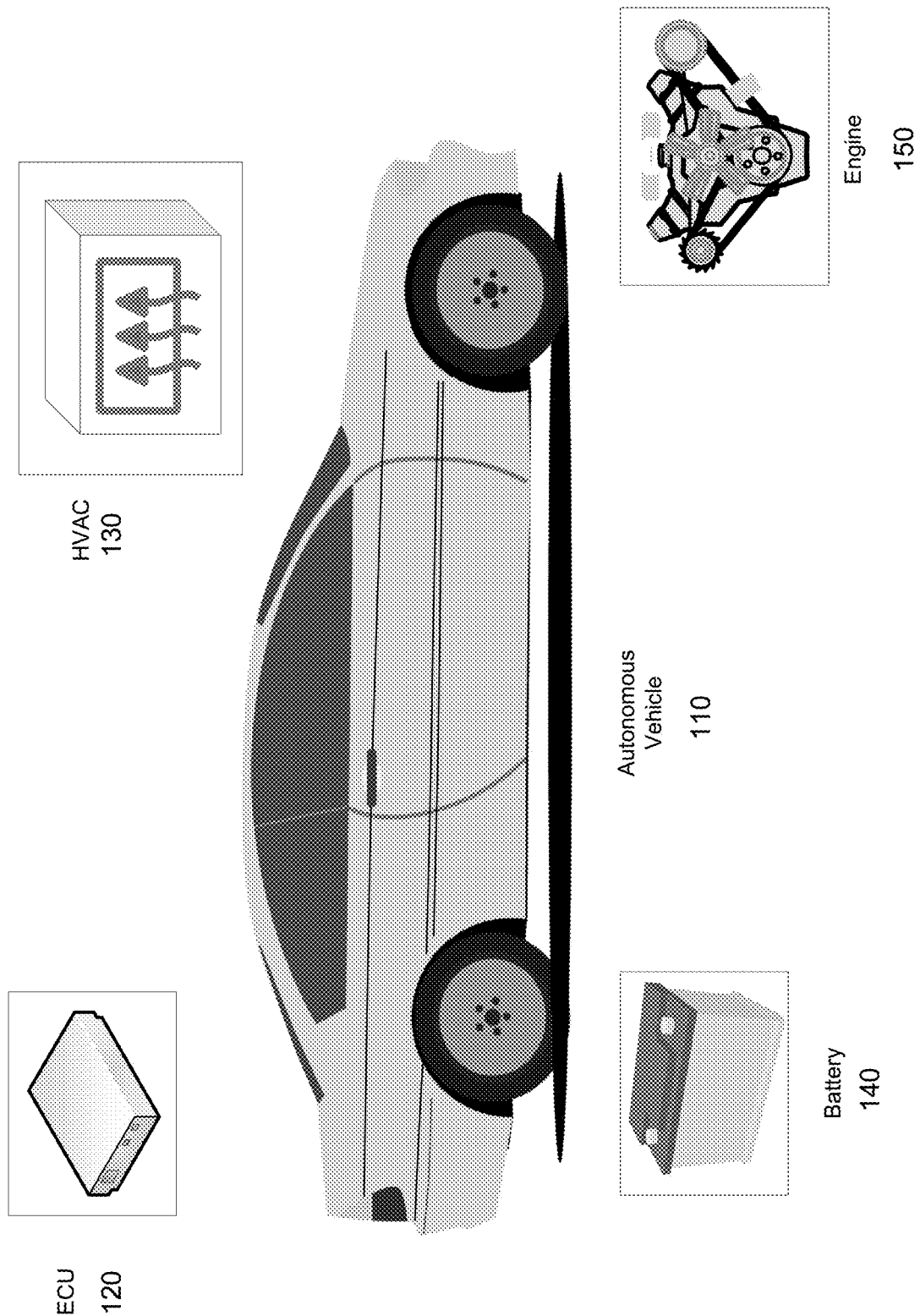
FIG. 1 illustrates an autonomous or semi-autonomous vehicle and several temperature-controlled components of the vehicle.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Temperature-controlled components of an autonomous or semiautonomous vehicle include the electronic control units (ECUs), battery, engine, and heating, ventilation, and cooling (HVAC) system. Typically, such temperature-controlled components are kept within an operating temperature range by separate thermal loops (e.g., a cooling loop) dedicated to each component. A system for controlling the temperature of disparate components of an autonomous vehicle using a unified thermal network, comprising one or more connected loops, presents several advantages. By adaptively controlling the flow rate and path of coolant supplied from the unified thermal network to each component or between components, the system provides for energy-efficient temperature control through the transfer of excess heat. By intelligently monitoring the temperature of each component and altering the routing and physical parameters of the coolant flow, waste heat can be put to use, component performance can be improved, and overall vehicle energy efficiency can be increased.

FIG. 1 illustrates an example autonomous vehicle 110. Within the autonomous vehicle are several temperature-controlled subsystems, which require thermal management to maintain their respective temperatures within a specified operating range. These include one or more ECUs 120, HVAC 130, the battery system 140, and the engine 150.

A vehicle operates in an autonomous or semi-autonomous mode through the operation of one or more of its ECUs. The ECUs can be comprised of one or more compute units, such as CPUS, GPUs, or FPGAs, as well as memory and/or other components. These compute units perform computing tasks related to operating the vehicle in its autonomous or semi-autonomous mode and controlling the components of vehicle. Such tasks can include processing sensor data, executing navigation algorithms, operating the engine and steering, and regulating various subsystems of the vehicle (e.g., the HVAC system 130).

An ECU compute unit may be comprised of integrated circuits (ICs) having a specified operating temperature range. An example operating temperature range for an ECU could be between 0° C. and 65° C. Outside of this temperature range, the compute units are more prone to logical faults, errors, and unreliable operation. Such errors can result in unsafe autonomous operation of the vehicle or complete inability to operate the vehicle.

The temperature of an ECU can fall outside its operating temperature range. This could happen, for example, when either: (a) the ECU self-heats (e.g. through Joule heating), (b) ambient conditions are above or below the operating temperature range of the ECU, or (c) a combination of (a) and (b). Case (a) can be achieved through heavy operation of the ECU under ordinary ambient temperature conditions. Examples of case (b) could be realized by very hot or very cold weather. In these cases, a temperature control system for the ECU is needed to maintain the ECU in its specified operating temperature range. Equivalent cases of rising above, or falling below, an operating temperature range can also be applied the battery, HVAC, engine, and other temperature-controlled subsystems of an automobile. It follows that such subsystems would each require a thermal loop for managing their temperatures.

Figure 2:
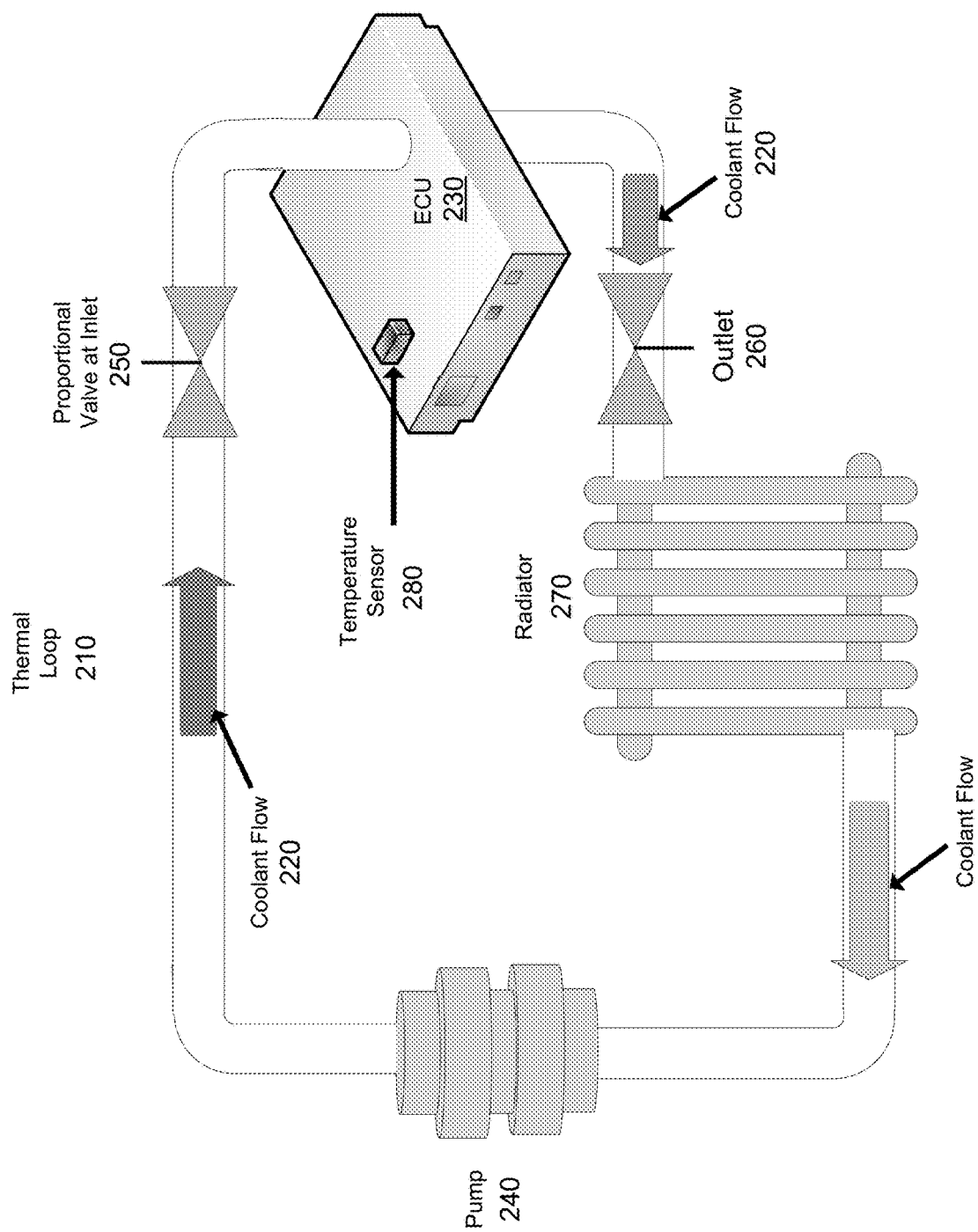
FIG. 2 illustrates an example thermal loop for an ECU.

Temperature control systems typically take the form of a thermal loop. FIG. 2 illustrates an example of a thermal loop 210. The thermal loop may be comprised of a tube or channel through which a coolant fluid flows 220 (or any other suitable substance, such as liquid or gas, with high thermal capacity for transferring heat). The cooling loop can transfer excess heat away from an ECU 230 through solid contact with the ECU 230 (e.g., via a heatsink). Under this condition, heat is conducted from the ECU 230 onto the channel of the thermal loop 210, and subsequently convected away by the motion of the coolant in the channel. Conversely, excess heat can be transferred to the ECU via convection of the coolant and subsequent conduction into the ECU through solid contact with the channel.

Coolant flow is produced through the action of a pump 240 within the thermal loop 210. The pump 240 creates a pressure difference in the coolant fluid, which is proportional to the square of the fluid velocity. The pump can be controlled by a proportional-integral-derivative (PID) controller to ensure a smooth response of the pump to a given pump control signal, and therefore short-term stability of the coolant flow rate. The flow rate of the coolant can be further controlled through the intervention of one or more proportional valves or other actuators at the inlet 250, or the outlet 260, which can be open, closed, or in an intermediate state defined on a continuous scale between open and closed. In this manner, a continuous range of flow rate through the valve may be obtained. The proportional valves or other actuators may also be controlled by one or more PID controllers. Actuators may include valves, pumps, or any other means of creating, modulating, or controlling fluid flow.

The thermal loop may be integrated with the ECU 230, in which case the coolant channel passes through the ECU itself, or through a volume of material affixed to the ECU (e.g. a cooling plate or heatsink). One or more radiators 270 or reservoirs may also be part of the thermal loop, which serve to dissipate or store heat, respectively.

To monitor the temperature of the ECU, a temperature sensor 280 may measure the local ECU 230 temperature. The temperature measurement of the sensor 280 may be used by a controller (e.g. PID) or other logic to adjust the coolant flow rate. The coolant flow rate may be adjusted by sending pulse-width modulated (PWM) signals to the pump and proportional valves.

Thermal loops may be applied to other temperature-controlled components of a vehicle. Temperature-controlled components within an autonomous vehicle include the ECUs 230, the HVAC system 130, the sensor systems (e.g., LIDARs, cameras, radars, etc.), the battery system 140, and the engine 150. Each of these components may have their own separate thermal loops. Within or affixed to each of these components, one or more temperature sensors 280 may determine the local temperature of the temperature-controlled component. The signals from the temperature sensors can be used by a thermal loop controller to determine the needed adjustment to the parameters of the thermal loop (e.g. coolant flow rate, inlet temperature) to cool or heat a given temperature-controlled component to its prescribed operating temperature.

The operating temperature ranges for each of the temperature-controlled components may differ greatly. For example, the battery system may have an operating temperature range of $-20°$ C. to $65°$ C., which differs from the ECU range of $0°$ C. to $65°$ C., the HVAC range of $15°$ C. to $25°$ C., and the engine range of $90°$ C. to $105°$ C. Assigning a separate thermal loop to each temperature-controlled component results in several thermal loops with differing heat transfer requirements. This arrangement leads to multiple, disconnected thermal loops, each with their own reservoirs, radiators, and pumps. Additionally, under this arrangement, excess heat in one thermal loop cannot be applied to another thermal loop where the excess heat is required. Conversely, cooling capacity of one loop cannot be applied to another loop where excess heat has accumulated. Consequently, energy is dissipated as heat within a given component's loop instead of being usefully applied to the heating or cooling requirements of another component. This leads to overall energy inefficiency of the vehicle.

Figure 3:
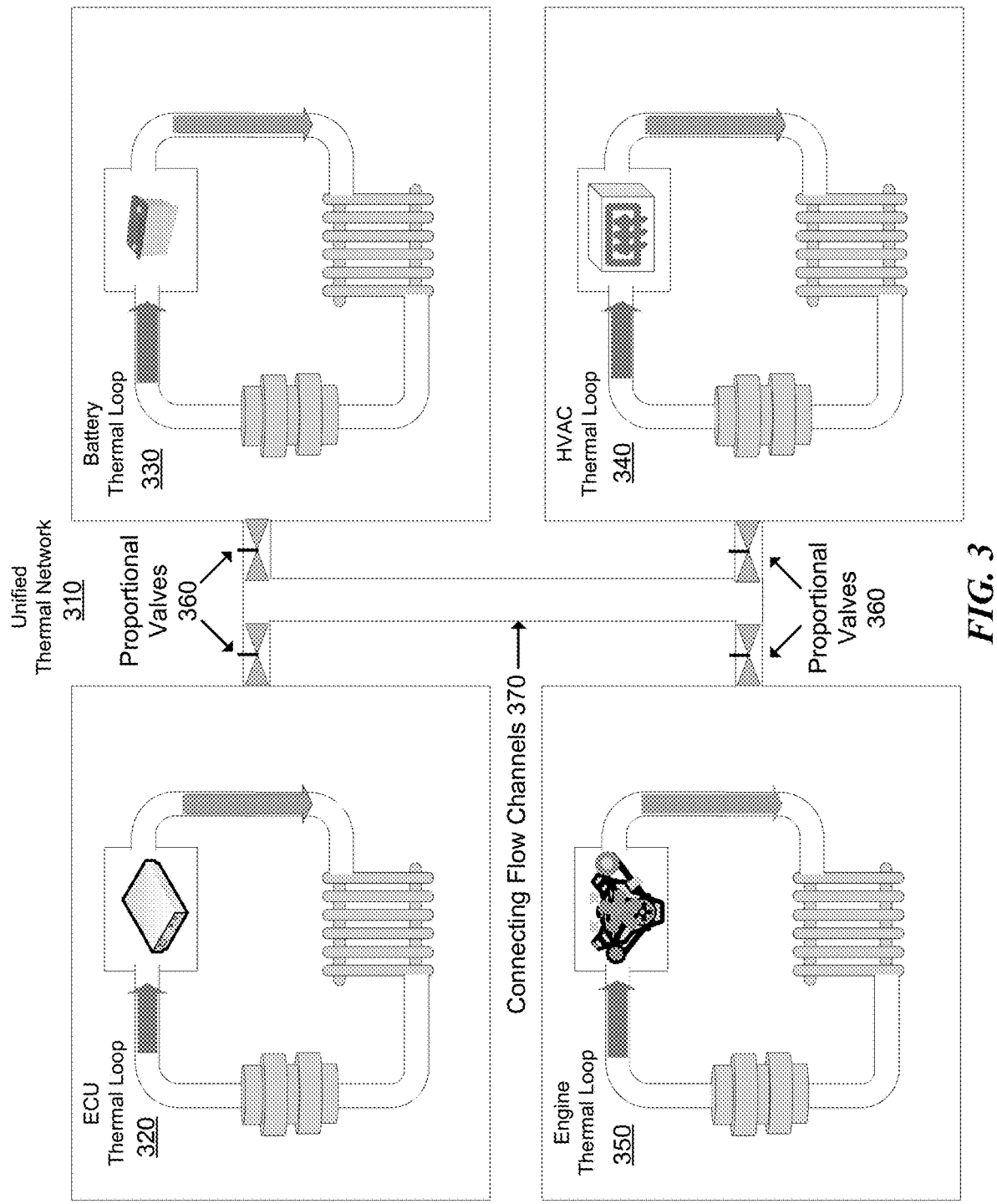
FIG. 3 illustrates an example unified thermal network with several temperature-controlled components.

Particular embodiments described herein relate to a unified thermal loop where a volume of coolant is shared between multiple temperature-controlled components (e.g., heat may be transferred from one temperature-controlled component of the automobile to one or more other components). FIG. 3 illustrates an example of a particular embodiment of a unified thermal network 310. For example, the unified thermal network 310 may have separate loop sections for the ECU 320, the battery system 330, the HVAC system 340, and the engine 350, respectively. In this embodiment, each temperature-controlled component of the automobile has its own thermal loop section that is connected via a network of proportional valves 360 to the main network. The proportional valves 360 and other thermal network elements may be controlled by a unified thermal network control system, which may determine the appropriate signals to be sent to the proportional valves 360 from one or more sensor inputs. The appropriate signals may control the proportional valves 360 so that the thermal network transfers heat (e.g., by coolant flow) to or from each thermal loop to bring the temperature of each thermal loop to a value appropriate for the loop's component (e.g., ECO, HVAC, and so on). The control system may identify components having temperatures out of their operating ranges using sensor inputs and send appropriate signals to the proportional valves 360 and/or other thermal network elements to open or close inlets, control pumps, and/or perform other suitable operations to cause the temperature in each thermal loop to reach the operating range of the component that is heated and/or cooled by the corresponding thermal loop. The control system may identify components and control network elements as described in FIG. 6, for example. The proportional valves 360 may include an inlet valve and an outlet valve for each thermal loop. The rate of coolant flow between the thermal loop 320, for example, and the flow channels 370 may be controlled by sending appropriate signals to the inlet and outlet valves 360 between the thermal loop 320 and the flow channels 370. Each valve may have an aperture that can be opened by a specified amount, e.g., from 0% (closed) to 100% (fully open). Numerous combinations of valve states can be obtained by applying the appropriate control signals to the valve network. In this manner, the valve network can be configured to route coolant to any desired section of the unified thermal network.

In particular embodiments, one or more unified network radiators can be connected to the unified thermal network. These radiators may each also have proportional valves at their inlets, allowing the flow of heated coolant to each radiator to be controlled. In this way, the number of radiators employed in dissipating the heat of one or more temperature-controlled components can be controlled. This is advantageous when the coolant reaches high temperatures due to a large amount of heat being produced by the various temperature-controlled components. Alternatively, radiators in the individual component thermal loops could be used in combination to dissipate heat. In particular embodiments, certain thermal loops may lack a radiator, relying instead on the dissipation capacity of one or more unified network radiators or one or more radiators associated to other thermal loops. In particular embodiments, one more reservoirs may be connected to the unified thermal network to store excess heat or unheated coolant for later use. Such reservoirs may be used in combination with radiators and other elements within the unified thermal network to enable a variety of configurations.

In particular embodiments, each loop section of the unified thermal network may or may not have a pump. One or more pumps in particular loop sections may be used to create fluid flow in other sections of the network with or without pumps. One or more pumps in particular loop sections may be used to augment the flow of coolant in other loop sections, whether or not those other loop section possess their own pumps. One or more unified network pumps connected to the unified thermal network may be used in combination with the network of proportional valves to direct coolant flow to any particular loop section.

The network of proportional valves can be located in the connecting flow channels 370 of the unified thermal network 310. The configuration of the connecting flow channels gives the unified thermal network a characteristic topology. A variety of topologies can be implemented. For example, a "daisy chain" topology may be used, where the outlet of the engine thermal loop is connected via a flow channel to the inlet of the ECU thermal loop, and the ECU outlet is connected to the inlet of the battery system thermal loop, and so on. Alternatively, the connecting flow channels may be configured so that any given cooling loop outlet can be directly connected to any given cooling loop inlet via the appropriate state of the network of proportional valves.

In one embodiment, the proportional valves and connecting flow channels can be configured so that coolant from any combination of temperature-controlled components can be channeled to any other combination. For example, if coolant from the engine, battery, and HVAC cooling loops needed to be diverted to the ECU cooling loop, an appropriate selection of valve states and common flow channels could be found to flow the coolant accordingly.

Through adjustment of the proportional valves and applied pump power, coolant flow rates and coolant temperature through a given section of the network can be controlled. The control can be affected through a number of signals provided to the valves, pumps, and other actuators. The signals may be generated by a unified thermal network control system, which determines the appropriate signals from one or more sensor inputs. For example, pressure sensors, flow rate sensors, local temperature sensors, and power consumption monitoring circuitry can provide signals used to determine the appropriate control signals to be applied to the pump, valves, etc.

One advantage of the unified thermal network is in its ability to transfer coolant from one temperature-controlled component to another based on the heating or cooling requirements of the respective components. For example, the ECU 320 may have a local temperature above its specified operating temperature range, in which case an increased flow of coolant through its section of the thermal network would be required. Alternatively, the flow rate of the ECU's section of the thermal network could be held constant while introducing lower-temperature coolant to the ECU's section. Low temperature coolant may be sourced from HVAC's 340 section of the loop by opening valves associated with HVAC's section. Alternatively, or in combination, the flow-rate to the ECU's section of the loop could be increased by opening the valves associated with its section of the loop. The overall flow-rate of the loop could be increased by increasing the applied power to a unified network pump, or a combination of the individual component loop pumps. Furthermore, the coolant temperature in one section of the loop could be locally increased by reducing the flow rate in that section, which increases the inlet pressure and exploits the temperature-pressure relationship of the fluid.

In addition to efficiently and intelligently controlling temperature for the various components, the unified thermal network enables several operational improvements to the vehicle itself. For example, for autonomous and semiautonomous vehicles, the ECUs and sensor units represent the principal high-cost components of the vehicle. By improving the temperature-control of the vehicle's ECU and sensor units, the operational lifetime of these components can be increased by protecting them from extreme and failure-inducing operating temperatures. As another example, electric vehicles realize reduced consumption of electric power when employing a unified thermal network, which translates to increased mileage. For example, the ability to redirect coolant flow can reduce the power consumption required by individual thermal loop pumps or unified network pumps. Alternatively, when cooling or heating capacity is not required, the individual thermal loop or network pumps can operate in low-power mode, as opposed to a maximum power or constant power mode where power would be wasted in the face of fluctuating thermal management requirements. Low-power mode would avoid unnecessary heating or cooling by reducing the coolant flow rate. This would consequently translate into reduced overall power consumption for the vehicle and therefore increased mileage.

Figure 4:
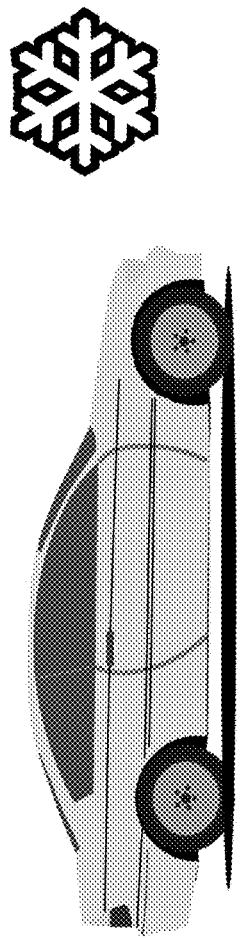
FIG. 4 illustrates an example of a unified thermal network in a cold startup operating mode.
Figure 4:
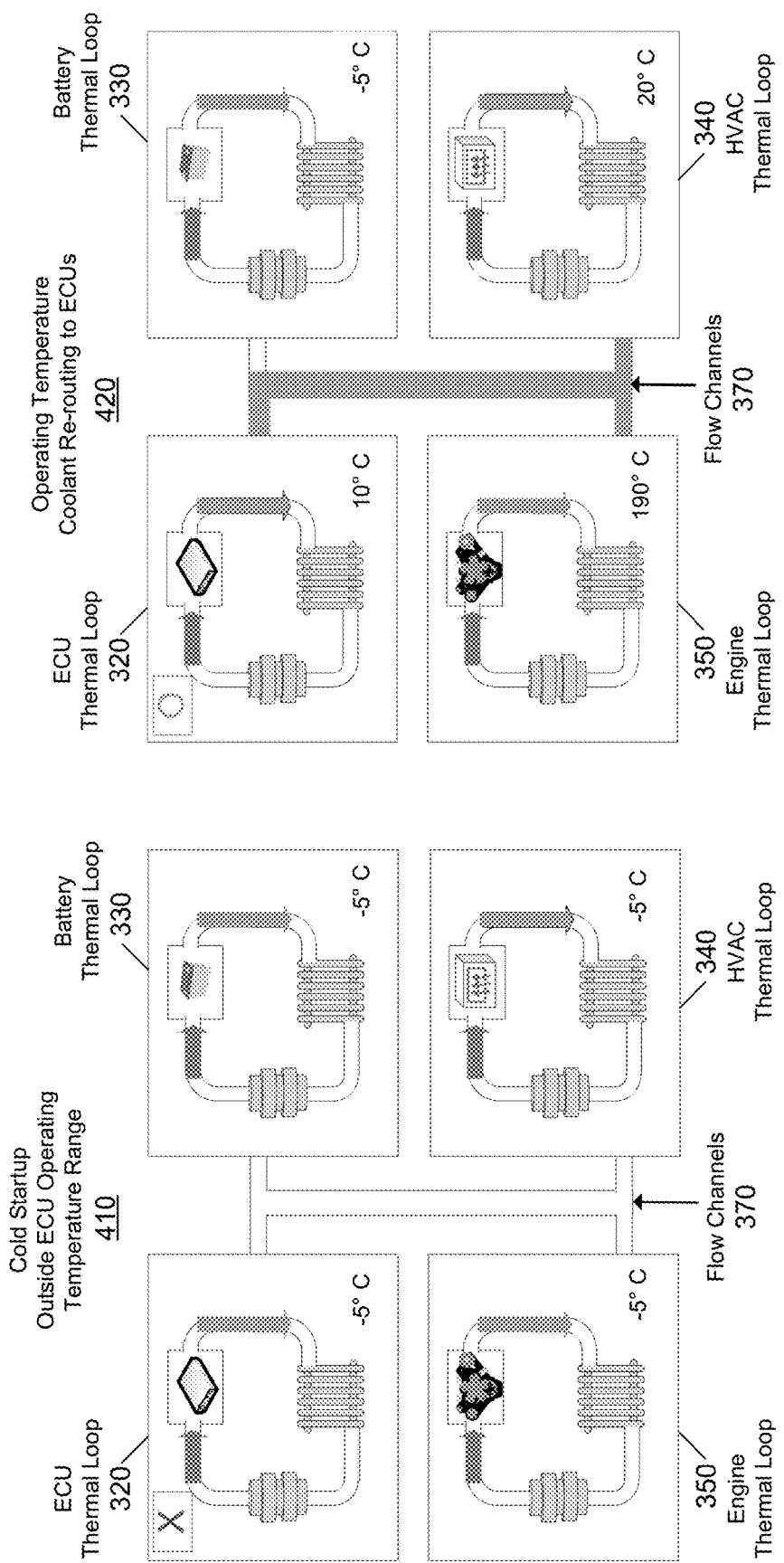

FIG. 4 illustrates an example of the unified thermal network used under low temperature conditions. The ambient temperature on a cold day may be −5° C. The temperature-controlled components of the vehicle may all be assumed to be at −5° C. if the vehicle has been inactive overnight, in which case the ECU, battery, HVAC, and engine thermal loops 320, 330, 340, 350 may have coolant temperatures of −5° C., as shown in an example cold startup state 410. At this starting temperature, since the ECUs are not within their operating temperature range (e.g., the range of 0° C. to 65° C.), they cannot operate the vehicle in an autonomous or semiautonomous mode. In the absence of external heating to actively raise the temperature of the ECUs to their minimum operating temperature of, e.g., 0° C., the ECUs will instead have to rely on self-heating (e.g., Joule heating of the ECUs' internal resistive components) to achieve the minimum operating temperature. This can result in the vehicle's ECU-based functionalities, such autonomous or semiautonomous driving modes, not being accessible for several minutes or more. Through the intelligent routing of coolant flow and excess heat, a unified thermal network can reduce the necessary start-up time for the vehicle's ECU-based functionalities.

When a driver activates the vehicle ignition, the engine starts and begins to reach its operating temperature of, for example, 190° C. An example operating temperature state 420 shows the flow of coolant between the flow of coolant between the ECU, HVAC, and engine thermal loops 320, 340, 350 when the engine is at its operating temperature. The HVAC system also begins to produce heat to increase the cabin temperature of the vehicle, and is at an operating temperature of 20° C. in the example 420. The battery system has a temperature of −5° C. in this example. The battery's temperature of −5° C. is within its operating temperature range of −20° C. to 65° C. Thus, the battery is not in need of temperature regulation, and therefore can operate with a reduced, or no, coolant flow. Thus, in this example, coolant is not flowing between the battery thermal loop 330 and the flow channels 370. The thermal network control system may make the determination that the battery's temperature is within its operating range and send appropriate control signals to close the inlet and/or outlet valves 360 of the battery thermal loop 330.

The unified thermal network can quickly bring the ECUs to their operating temperature range of 0° C. to 65° C. by routing heated coolant from the engine thermal loop 350 and HVAC thermal loop 340 to the ECU thermal loop 320 through the flow channels 370. The thermal network control system may determine, based on sensor input, that the ECU's temperature is below its operating range and send appropriate control signals to open the inlet and/or outlet valves 360 of the ECU thermal loop 320 and the engine thermal loop 350 to cause the high-temperature coolant to flow between the ECU thermal loop 320 and the engine thermal loop 350, thereby heating the coolant and the ECU. The heated coolant may have a temperature of up to, e.g., 190° C. as a result of being heated by the 190° C. engine (and the 20° C. HVAC unit, since the valves 360 of the HVAC thermal loop 340 are open in this example). When the ECU reaches a temperature in its operating range, the control system may send appropriate signals to close the inlet and/or outlet values 360 of the ECU thermal loop 320 and/or the engine thermal loop 350 to stop the transfer of coolant between the loops 320, 350 via the flow channels 370. The control system may similarly control the valves 360 of the HVAC thermal loop 340, as described further with reference to FIG. 6.

In this example, the ECUs are brought to an operating temperature of 10° C. by the heated coolant routed to the ECUs, allowing autonomous operation of the vehicle within a short time from the point of engine ignition. This flow-channel heating is contrasted with the case of the ECUs achieving their operating temperature through self-heating or using a dedicated independent cooling loop for the ECUs. The large amount of excess heat produced by the engine provides a significant advantage in this example, as the excess heat produced by the engine can rapidly heat the coolant to be subsequently routed by the flow channels 370 of the unified loop to the ECUs.

Figure 5:
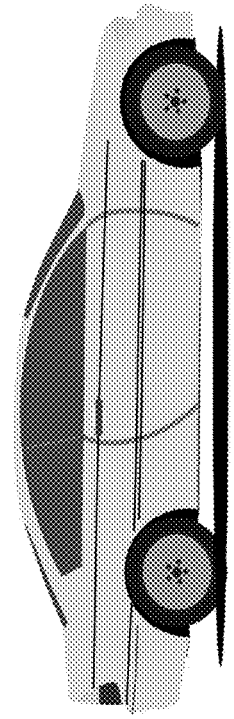
FIG. 5 illustrates an example of a unified thermal network operating with an ECU in boost mode.
Figure 5:
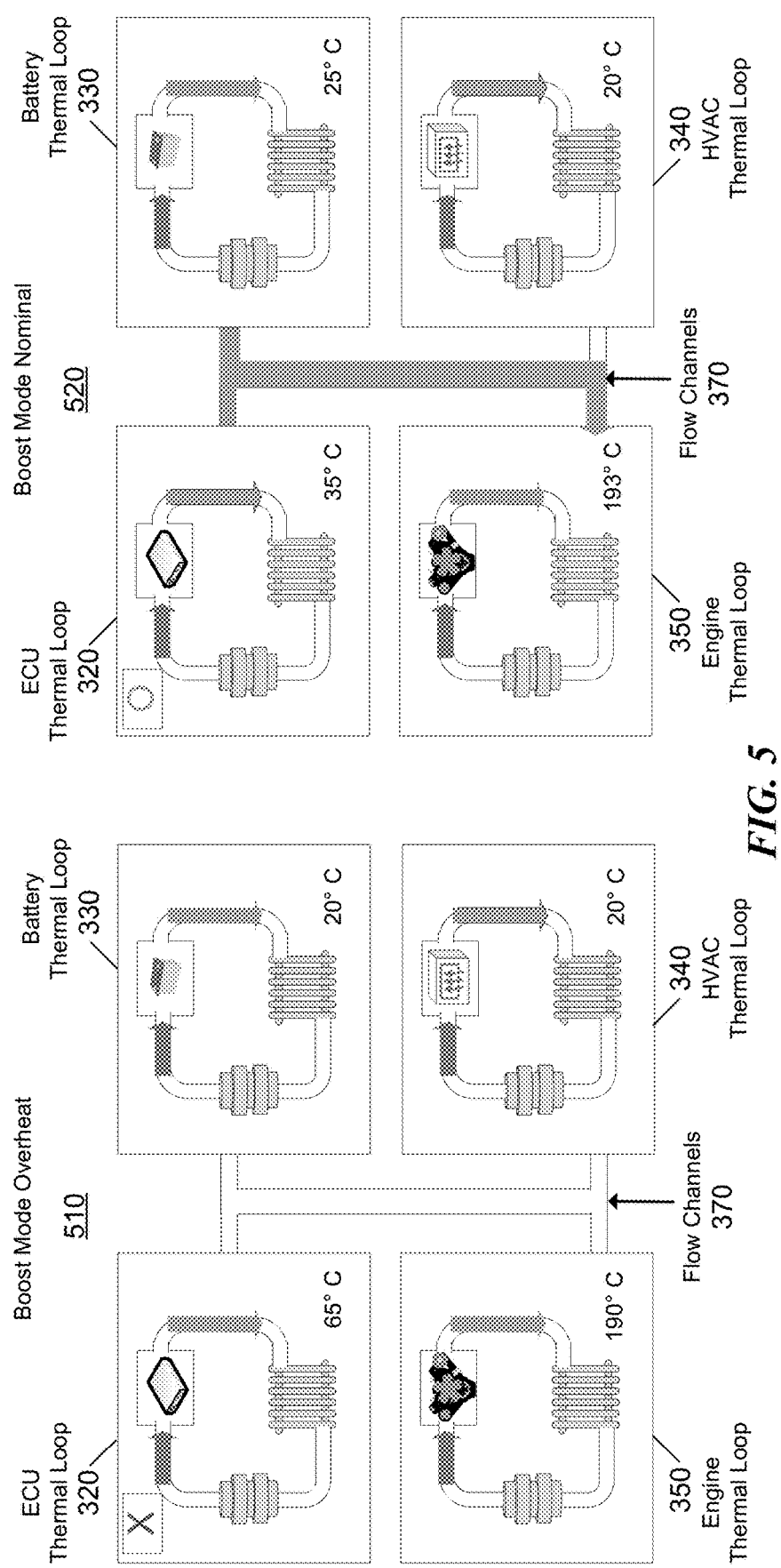

FIG. 5 illustrates an example of the ECUs operating in a "boost" mode. In certain circumstances it may be preferable for the ECUs to operate at a high clock speed for a short period of time to complete a computationally intensive task. Such a task might be the fast processing of LiDAR data, or processing other data associated with the vehicle's sensors, while operating in autonomous mode. As an example, while operating in an autonomous or semiautonomous mode, a vehicle may be driving through an area that has not been mapped, or for which no map data is available. This scenario would require rapid mapping, localization, image processing, and navigation to safely operate the vehicle in the new environment. Alternatively, the vehicle may be in an area with rapid and heavy traffic, or many fast-changing obstacles. Each of these scenarios would require additional computing power to successfully process the additional data associated with the new or changing environment. Such computing requirements could be accommodated by running the relevant ECUs in boost mode.

While operating in boost mode, the ECUs may exceed their operating temperature range. In this example, an ECU jumps to a temperature of 65° C. in a state 510. In this example, the valves 360 between the thermal loops and the flow channels 370 are initially closed, so coolant is not flowing between the thermal loops. Before the ECU can exceed its operating temperature limit, the unified thermal network engages. The thermal network control system may detect that the ECU's temperature has increased and is near its operating temperature limit. In response, the control system may cause the unified thermal network to reroute the coolant flow, causing coolant to circulate to other sections of the unified thermal network, modulate the coolant flow rate, or any combination thereof. The other sections of the unified thermal network may be thermal loops associated to other temperature-controlled components, or other sections in the unified thermal network with excess heat storage or dissipation capacity. The excess heat may be dissipated through radiators, the temperature-controlled components themselves, other thermal elements in the unified thermal network, or component-specific loops and network sections.

Under the example of the ECUs operating in boost mode, the coolant quickly dissipates the excess heat of the ECUs through the other sections of the loop, thereby bringing the ECUs' operating temperature to within their operating temperature range in a state 520. In this example, the inlet and outlet valves 360 of the ECU thermal loop 320, the inlet and outlet valves of the battery thermal loop 330, and the inlet valve of the engine thermal loop 350 are opened to appropriate amounts by signals from the control system to cause coolant to flow between the ECU and battery loops 320, 330 and to the engine loop 350 via the flow channels 370.

The determination as to which particular unified thermal network section, element, or temperature-controlled component to route the heated coolant may be based on several criteria. Such criteria may include the thermal margin of a component. For example, via the control system and temperature sensors of the unified thermal network, it may be determined that a given temperature-controlled component has sufficient thermal margin so it could absorb heat and still be within its operating temperature range. For example, the engine may have a temperature of 190° C., giving a thermal margin of 5° C. (i.e., an upper limit of 195° C.). The amount of heat the engine can absorb can then be calculated from the thermal margin, the thermal mass of engine, heat dissipation rate of engine, and other factors. If it is determined that the engine allows for the excess heat to be transferred to it, logic within the control system of the unified thermal network may then direct coolant from the ECUs to the engine to lower the temperature of the ECUs. Inversely, if the thermal margin of the engine is very small or negative, coolant will not be directed to the engine, but alternatively, for example, to the HVAC system.

The coolant routing may be further determined by the heat dissipation capacity of a component or thermal loop associated to a component. For example, the thermal margin of the HVAC system may be very small, but the rate of heat dissipation may be high due to the active heat removal being performed by the HVAC system. The determination may then be made to route coolant from the ECUs to the HVAC system due to its high heat dissipation rate. Inversely, if the heat dissipation rate of the HVAC system is very small, coolant will not be directed to the HVAC system, but alternatively, for example, to another component.

Alternatively or in addition to routing the coolant flow, the coolant flow rate could be modulated by the unified thermal network. The coolant flow rate in a given section of the unified thermal network may be increased to increase the rate of heat transfer from a given temperature-controlled component or network section. Inversely, if a given temperature-controlled component is well within its operating temperature range, coolant flow rate for that component could be reduced to reduce power consumption of the respective coolant pump, thereby increasing energy efficiency. The determination of coolant flow rates in the unified thermal network may be calculated using the thermal margin, component heat capacity, component heat dissipation rate, or other factors.

Another example use of the unified thermal network would be the case of hot weather. The ambient temperature on a hot day may be 35° C. The ECUs may be approaching or beyond the upper limit of their operating temperature range of 65° C. This ECU temperature may not necessarily be due to the ECUs operating in boost mode, but rather due to the ECUs having a nominal temperature elevation relative to the ambient environment. This temperature elevation may be due to an ordinary computational load or other ordinary condition intrinsic to the ECU. In this case, the unified thermal network can utilize the cooling capacity of other temperature-controlled components, namely those with higher operating temperature limits or high heat dissipation capacity. An example may include the engine or other temperature-controlled components with a high temperature threshold. A further example would be a temperature-controlled component with a high heat dissipation capacity, such as the HVAC system. In this case, the unified thermal network could direct coolant from the ECUs to the HVAC system, which could dissipate the heat transferred from the ECUs. Alternatively, the coolant could be directed from the ECUs to the engine, with its high operating temperature limit. As a further alternative, coolant could be directed from the ECUs to a combination of both the HVAC system and the engine.

In particular embodiments, the arbitration logic for controlling coolant routing and flow rate within the unified cooling loop is implemented by a control loop comprising a control system. The control system is implemented by, for example, a computing system, receiving one or more signal inputs, and containing stored data. Signal inputs may include signals from temperature sensors, flow rate sensors, pressure sensors, power consumption sensors, valves, or other signal sources associated to each of the temperature-controlled components or specific sections, locations, or elements of the unified thermal network. Examples may include signals indicating temperatures of certain components, flow rates in certain network sections or inlet locations, pump power consumption, degree of valve closure, or other information. Stored data may include operating temperature limits of the temperature-controlled components, current or past signal data, calibration data, or other data. Such data may, for example, be used for calibrating, filtering, or performing other algorithmic tasks on the received signals.

Based on the arbitration logic implemented by the controller, PWM or other signals are sent to the pumps and proportional valves within the unified cooling loop to appropriately route the coolant and modulate the coolant flow rate. A preferred embodiment would include the use of proportional-integral-derivative (PID) control to maintain stability of the transient behavior of the pumps, proportional valves, flow rates, and other system variables associated to the unified thermal network.

Figure 6:
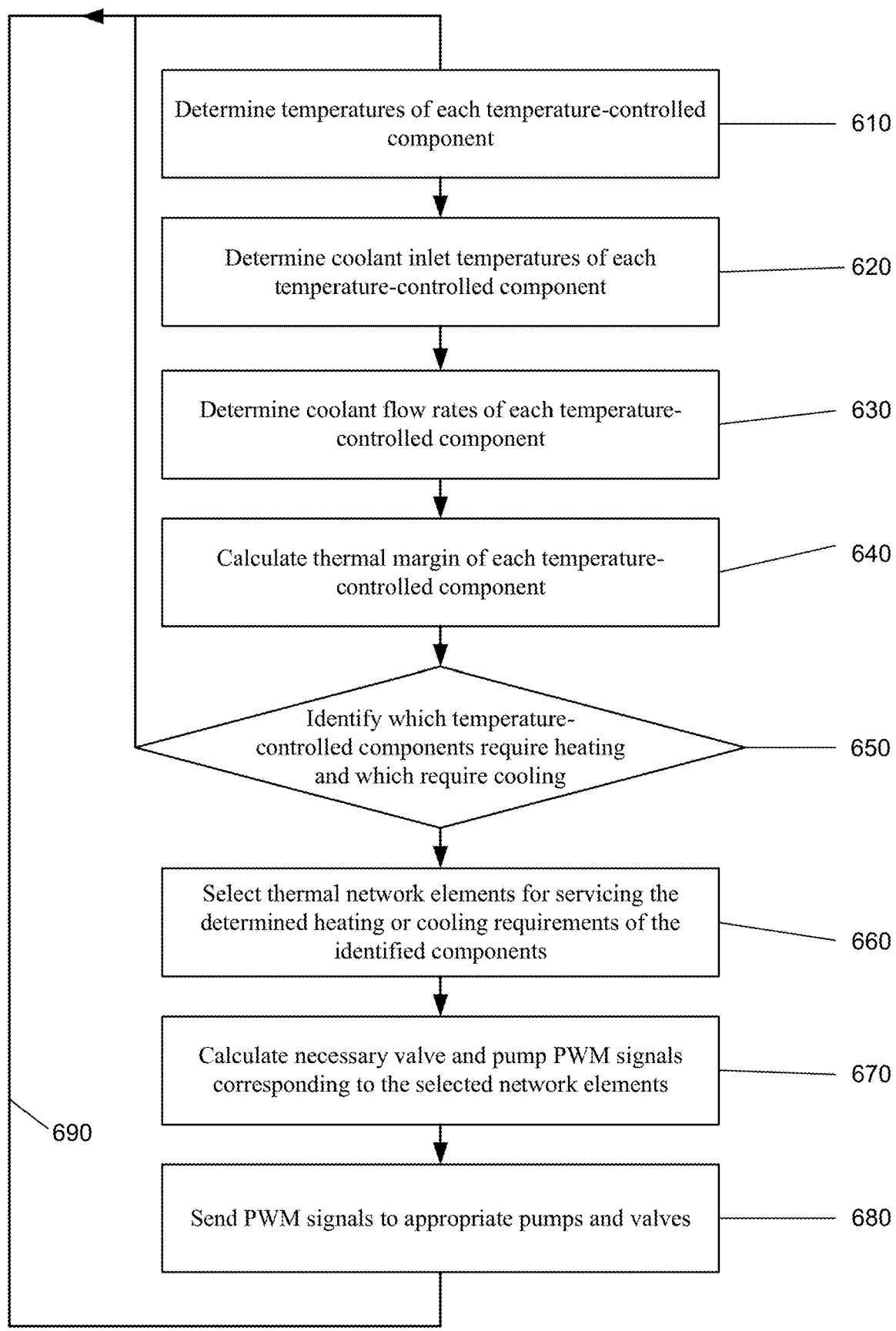
FIG. 6 illustrates an example method for controlling coolant flow within the unified cooling loop.

FIG. 6 illustrates an example arbitration method for the controller of the unified thermal network. At step 610, the temperature of each temperature-controlled component is determined (e.g., via embedded temperature sensors). At step 620, the coolant inlet temperature of each temperature-controlled component is determined. The coolant temperature could be measured e.g. via a temperature sensor embedded in the coolant channel at the inlet of a given temperature-controlled component. At step 630, the coolant flow rate at each of the temperature-controlled components is determined. The coolant flow rates could be determined by, for example, flow meters at the inlet of a given temperature-controlled component.

At step 640, the thermal margins of each temperature-controlled component are calculated. An example calculation would be determining that an ECU temperature is 40° C. The 40° C. value would be subtracted from the upper operating temperature range limit of 65° C. for the ECU, yielding a margin of +25° C. Similar calculations can be performed for e.g. the engine and the battery systems. Additionally, HVAC utilization, as a percentage of maximum utilization, can be computed to determine the unused heating or cooling capacity of the HVAC system.

At step 650, temperature-controlled components in need of additional cooling or heating are identified. This determination is based on the computations and determinations of steps 610 to 640. The identification of a given component as requiring heating or cooling may be based on the calculation of a thermal objective of the component. This thermal objective may be any function of one or more variables, and may be based on several factors, including the thermal margin, thermal mass, and heat dissipation rate of the component. The thermal objective may be a single scalar value, a tuple of scalar values, Boolean variables, or other mathematical structures. The thermal objective may be an objective function, a target expressed in some physical quantity (e.g. temperature, heat flux), or any other expression relating to the thermal parameters of the temperature-controlled component.

For example, the calculation of the thermal objective for a given component may indicate that a certain amount of heat flux into (i.e., heating required) or out of (i.e., cooling required) the component is necessary to return or maintain the component in its operating temperature range. Alternatively, or in combination, the thermal objective may be the calculation of the thermal margin and some associated required coolant flow rate.

For example, it may be determined that the ECU has a thermal margin of −5° C., and its thermal mass and heat dissipation rate indicate that heat must be removed at a rate of an additional 10 W outward flux (i.e., cooling) to return the ECU to its operating temperature range within a 5 second window. The thermal objective for the ECU may then be expressed as a combination, or tuple, of the 10 W incremental heat flux and the 5 second window. An example alternative value of the thermal objective might be 5 W incremental heat flux over a 10 second time window. Several such thermal objective calculations may be performed on a given component, yielding a surface of objective values. This surface may be useful in defining a range of thermal management scenarios for the given component.

Identifying a given component as requiring heating or cooling (i.e., inward or outward heat flux) may be performed by calculating the difference between the component's thermal objective values and a threshold. For example, if an ECU has a thermal objective of 10 W over a 5 second window, and a threshold of 7.5 W over a 5 second window is defined for the ECU, then the ECU would be identified as requiring cooling (i.e. heat is not being removed from the ECU fast enough, and more cooling capacity is required). The analogous case for a component requiring heating would be for comparing some threshold against a thermal objective specifying inward heat flux.

At step 660, a combination of unified thermal network elements is determined to service the heating or cooling requirements of the temperature-controlled components identified in step 650. The unified thermal network elements comprising this combination can include valves, pumps, actuators, radiators, temperature-controlled components per se, thermal loops associated with temperature-controlled components, or any other element of the network that can be algorithmically determined to help satisfy a thermal objective.

For example, the thermal objectives calculated in step 650 may indicate that certain components require cooling, while others require heating, or any combination thereof. These heating or cooling requirements for the respective components may be expressed as a combination of heat fluxes over certain time windows. Algorithmic methods may be used to determine whether a coolant routing or flow rate configuration exists such that the unified thermal network can service one or more of those requirements associated with the temperature-controlled components identified in step 650.

The combination of unified thermal network elements employed in fulfilling the thermal requirements could be derived using algorithmic methods covering a range of objectives. For example, using algorithmic methods, a combination of temperature-controlled components may be identified where the respective thermal requirements are complementary. For example, the ECUs may be identified as requiring 10 W of inward heat flux (i.e., heating) over a 5 second time window. The HVAC system may be identified as requiring 10 W of outward heat flux over a 5 second time window. The appropriate combination of unified thermal network elements to service these needs would be a corresponding configuration of proportional valves and pumps to route the coolant between the ECU and HVAC and directly transfer the heat over the 5 s time window. The required valves and pumps corresponding to this configuration would comprise the combination of unified thermal network elements. The specific combination of pumps and valves required would depend on the topology and current state of the unified thermal network, and could be determined and optimized by algorithmic means such as combinatorial search or other optimization methods.

The combination of unified thermal network elements employed in fulfilling the thermal requirements could be determined based on feasible flow rates and valve configurations. For example, if it is determined that the ECUs cannot be cooled at a rate of 10 W outward heat flux over 5 s using any feasible flow rate achievable by the unified thermal network actuators, it may be determined that a flow rate allowing 3 W of outward heat flux over 15 s is feasible. The latter configuration may be subsequently selected with the corresponding valves and pumps comprising the combination of selected unified thermal network elements. Alternatively, it may be determined that an ECU outward heat flux of 10 W over 5 s is only feasible at the lower flow rate if a valve is opened to the HVAC unit, allowing additional outward flux capacity. This configuration may be subsequently selected with the corresponding valves and pumps comprising the combination of selected unified thermal network elements.

The combination of unified thermal network elements employed in fulfilling the thermal requirements could be determined based on optimizing pump power consumption. For example, if the ECU required an outward heat flux of 10 W over 10 seconds, a coolant flow rate corresponding to employing two pumps at full power may be required. However, if it were also determined that an outward heat flux of 3 W over 30 seconds was also sufficient according to the thermal objective of the ECU, and that only one network pump at full power need be employed to achieve the lower required coolant flow rate, then this latter configuration may subsequently be selected. The corresponding valves and pumps under this latter configuration would comprise the combination of selected unified thermal network elements.

At step 670, control signals for the combination of unified network elements selected at step 660 are generated. PWM or other signals may be generated for the selected configuration of pumps and valves. The specific values encoded by the signals are determined by the calculated flow rates, pump powers and valve states determined under the combination selected in step 660. For example, a PWM signal that engages the engine pump at 80% of its maximum power may be sent to the engine pump. 80% of maximum engine pump power may be the necessary power required to achieve a 1 L/min flow rate at the ECU inlet. The 1 L/min flow rate would be the calculated flow rate required by the cooling requirements determined in step 650, allowing it to achieve an incremental outward heat flux of 10 W in 5 s according to the calculated thermal objective.

At step 680, the generated signals are sent to the unified thermal network elements identified in step 660. For example, the generated PWM signal for the engine pump may be sent via a signal path to the engine pump, causing the pump to throttle its power to 80%. Likewise, signals may be sent to valves in the unified thermal network allowing an increased inlet flow into the ECU section. The signal may, for example, cause the valves to open from a 50% to a 90% aperture. In this way, the arbitration logic controls the functioning of the unified thermal network and achieves the desired network configuration derived from the previous steps. The control logic of steps 610 through 680 operate continuously, implementing a control loop 690.

Another particular embodiment of the unified thermal network may be a multi-ECU unified thermal network, which services multiple ECUs. In this embodiment, a volume of coolant transfers heat from one ECU to another. In this manner, excess heat from one ECU can be transferred to another or dissipated through one or more radiators in the unified thermal network. This embodiment can be optionally combined with a global unified thermal network that incorporates other temperature-controlled components such as the battery system, HVAC, and the engine.

Figure 7:
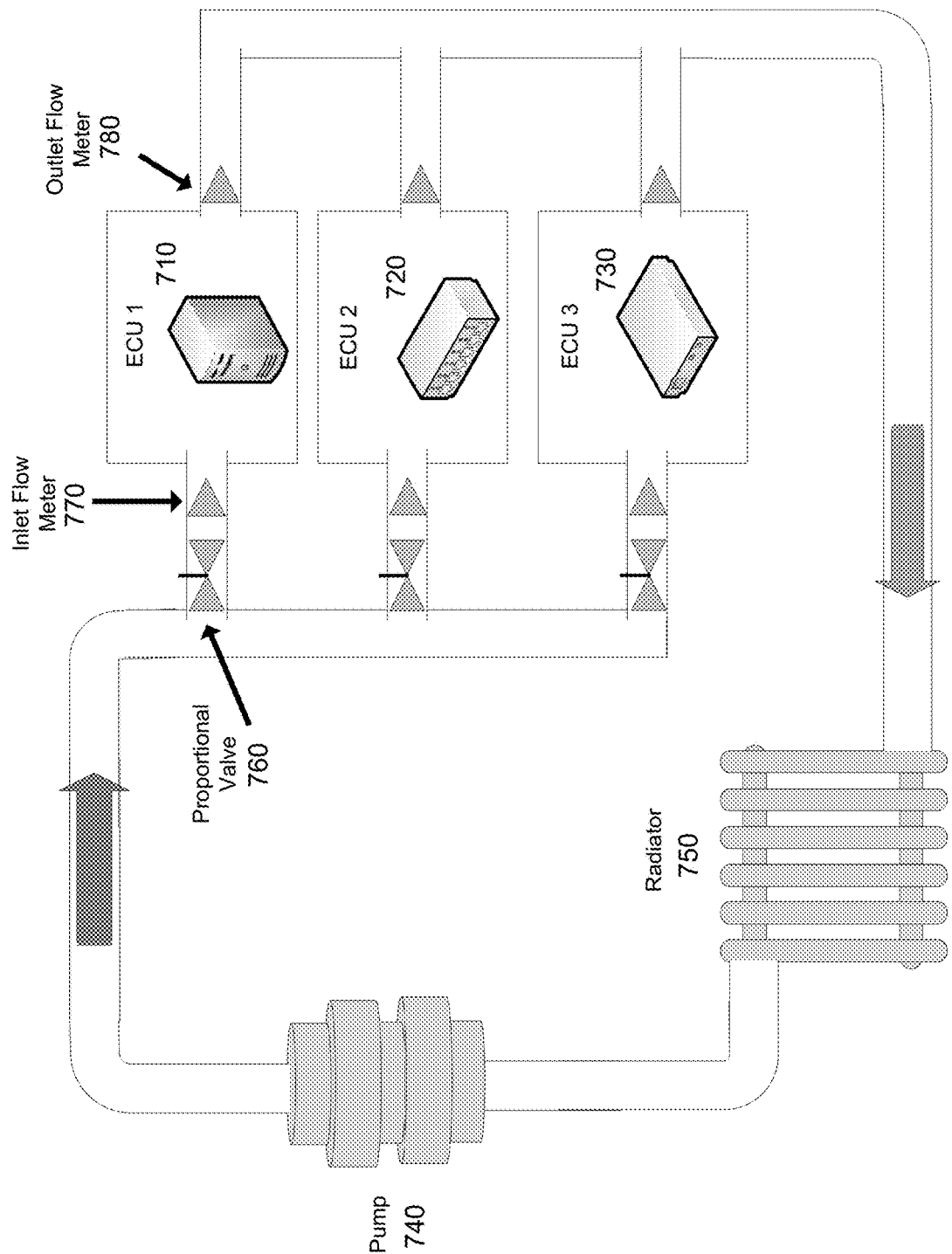
FIG. 7 illustrates an example of a unified thermal network for multiple ECUs.

FIG. 7 illustrates an example unified thermal network for several ECUs. These several ECUs may include discrete compute units assigned to separate computational tasks associated with the autonomous vehicle. One ECU may be tasked with processing sensor data (ECU 1, 710), while another may be assigned to wireless communications (ECU2, 720), while another may manage the lower-level functions of the vehicle's operations (ECU3, 730).

In this embodiment, a single network pump 740 is used along with one or more network radiators 750. Each branch of the network associated with an ECU has one or more proportional valves 760 controlling the flow rate of the coolant to that particular ECU. The flow rate of the coolant to a particular ECU is monitored by a flow meter 770 at the inlet of the branch, and also preferably at the outlet of the same branch 780.

In other embodiments, one or more branches of the thermal network may be alternatively used to control the temperature of an HVAC system, battery system, engine, or any other temperature-controlled component of an automobile. The single network pump could, in such embodiments, be used to flow coolant to any one of these components in addition to one or more ECUs.

Figure 8:
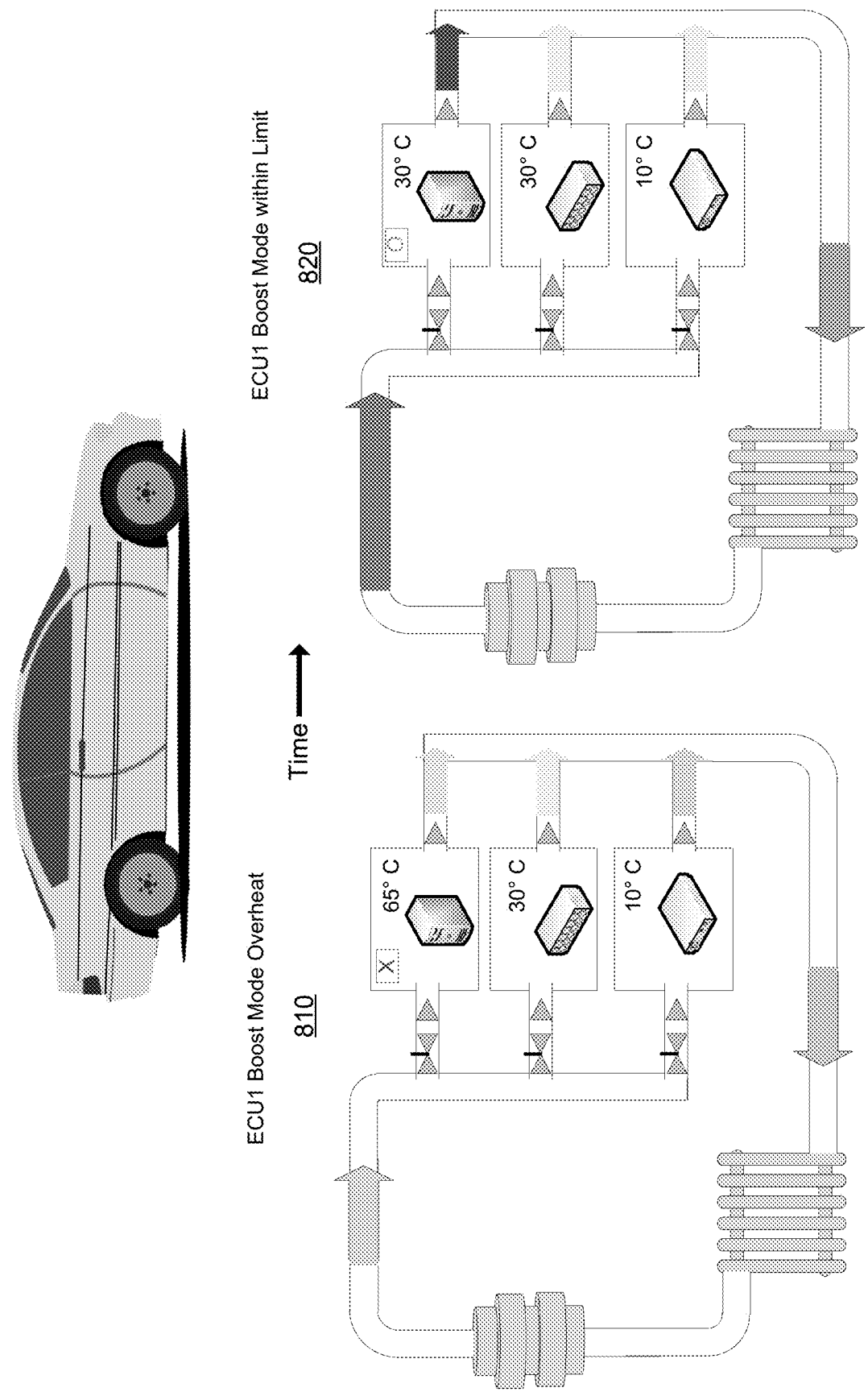
FIG. 8 illustrates an example of a multi-ECU unified thermal network operating with one ECU in boost mode.

FIG. 8 illustrates an example of a multi-ECU unified thermal network being used to dissipate excess heat from ECU1. ECU1 may be operating at its maximum power limit, and is therefore approaching the upper limit of its operating temperature range in a state 810. ECU1 may be processing a large amount of sensor data, and boost mode computation may be required. However, ECU2 and ECU3 are within their operating temperature limits, and require little or no coolant flow.

A conventional approach would be to assume that all ECUs are operating at maximum power, and to supply each ECU with the corresponding required coolant flow, irrespective of the actual power consumption. This is inefficient in terms of pump power, and therefore inefficient in terms of the overall fuel economy of the vehicle.

In this example, temperature and power consumption is monitored at each of the ECUs. After determining that ECU2 and ECU3 are operating below their maximum power consumption and temperature limits, a control loop can subsequently reduce the coolant flow to ECU2 and ECU3 while increasing the coolant flow to ECU1 in a state 820. This may be implemented by closing the proportional valves at the inlets of ECU2 and ECU3, and optionally further opening the valve at the inlet of ECU1. Alternatively, this approach can be combined with increasing the overall flow rate of the loop by increasing the pump power. Subsequently, the temperature of ECU1 is lowered to comfortably within its operating temperature range while still operating in boost mode. ECU1 can continue to operate in boost mode through continued use of the excess coolant flow from ECU2 and ECU3.

Figure 9:
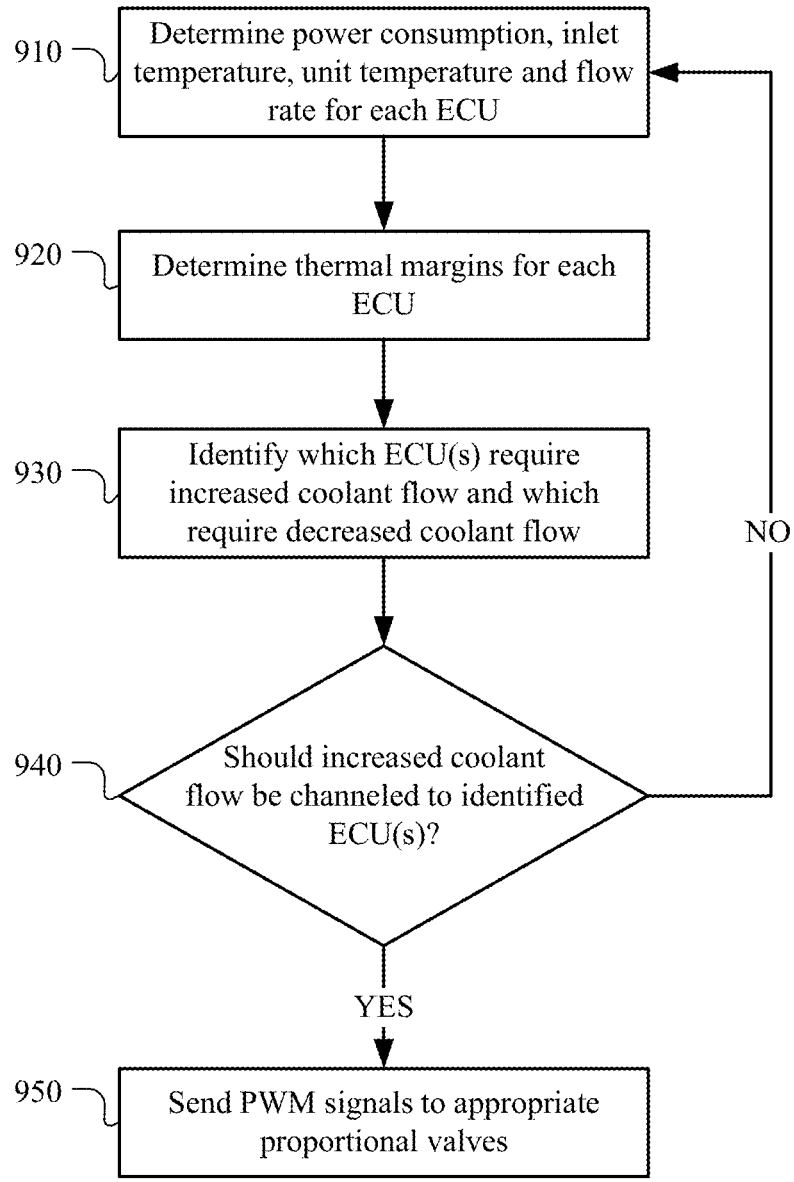
FIG. 9 illustrates an example method for controlling coolant flow within a multi-ECU unified thermal network.

FIG. 9 illustrates example arbitration method for the control loop of the multi-ECU unified thermal network. Each ECU may be, for example, a CPU, GPU, FPGA, or other electronic component. At step 910, the power consumption, inlet coolant temperature, unit temperature, and coolant flow rate are determined for each of the ECUs. At step 920, the thermal margin is calculated for each of the ECUs. At step 930, the ECU(s) in need of increased coolant flow (if any), and the ECUs that can admit reduced coolant flow (if any), are identified. Based on this identification, a decision is made at step 940 as to whether increased coolant flow should be channeled to the ECU(s) identified as requiring more coolant. If no ECUs are identified as requiring more coolant flow, the loop returns to step 910. If ECUs with increased coolant requirements are identified, appropriate PWM signals are sent to proportional valves at step 950 to channel additional coolant flow to the identified ECU(s).

Figure 10:
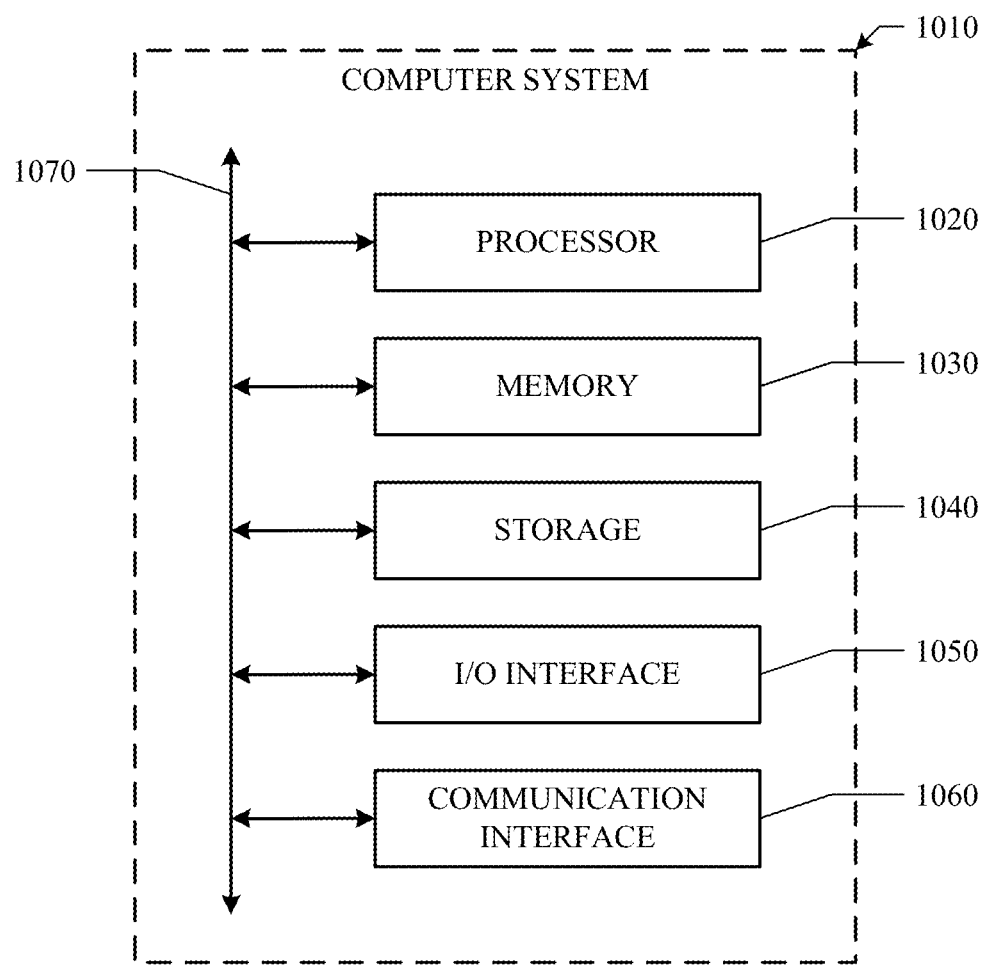
FIG. 10 illustrates an example computer system.

FIG. 10 illustrates an example computer system 1010. In particular embodiments, one or more computer systems 1010 perform one or more steps of one or more methods described or illustrated herein. In particular embodiments, one or more computer systems 1010 provide the functionalities described or illustrated herein. In particular embodiments, software running on one or more computer systems 1010 performs one or more steps of one or more methods described or illustrated herein or provides the functionalities described or illustrated herein. Particular embodiments include one or more portions of one or more computer systems 1010. Herein, a reference to a computer system may encompass a computing device, and vice versa, where appropriate. Moreover, a reference to a computer system may encompass one or more computer systems, where appropriate.

This disclosure contemplates any suitable number of computer systems 1010. This disclosure contemplates computer system 1010 taking any suitable physical form. As example and not by way of limitation, computer system 1010 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1010 may include one or more computer systems 1010; be unitary or distributed; span multiple locations; span multiple machines; span multiple data centers; or reside in a cloud, which may include one or more cloud components in one or more networks. Where appropriate, one or more computer systems 1010 may perform without substantial spatial or temporal limitation one or more steps of one or more methods described or illustrated herein. As an example and not by way of limitation, one or more computer systems 1010 may perform in real time or in batch mode one or more steps of one or more methods described or illustrated herein. One or more computer systems 1010 may perform at different times or at different locations one or more steps of one or more methods described or illustrated herein, where appropriate.

In particular embodiments, computer system 1010 includes a processor 1020, memory 1030, storage 1040, an input/output (I/O) interface 1050, a communication interface 2100, and a bus 1070. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1020 includes hardware for executing instructions, such as those making up a computer program. As an example and not by way of limitation, to execute instructions, processor 1020 may retrieve (or fetch) the instructions from an internal register, an internal cache, memory 1030, or storage 1040; decode and execute them; and then write one or more results to an internal register, an internal cache, memory 1030, or storage 1040. In particular embodiments, processor 1020 may include one or more internal caches for data, instructions, or addresses. This disclosure contemplates processor 1020 including any suitable number of any suitable internal caches, where appropriate. As an example and not by way of limitation, processor 1020 may include one or more instruction caches, one or more data caches, and one or more translation lookaside buffers (TLBs). Instructions in the instruction caches may be copies of instructions in memory 1030 or storage 1040, and the instruction caches may speed up retrieval of those instructions by processor 1020. Data in the data caches may be copies of data in memory 1030 or storage 1040 that are to be operated on by computer instructions; the results of previous instructions executed by processor 1020 that are accessible to subsequent instructions or for writing to memory 1030 or storage 1040; or any other suitable data. The data caches may speed up read or write operations by processor 1020. The TLBs may speed up virtual-address translation for processor 1020. In particular embodiments, processor 1020 may include one or more internal registers for data, instructions, or addresses. This disclosure contemplates processor 1020 including any suitable number of any suitable internal registers, where appropriate. Where appropriate, processor 1020 may include one or more arithmetic logic units (ALUs), be a multi-core processor, or include one or more processors 1020. Although this disclosure describes and illustrates a particular processor, this disclosure contemplates any suitable processor.

In particular embodiments, memory 1030 includes main memory for storing instructions for processor 1020 to execute or data for processor 1020 to operate on. As an example and not by way of limitation, computer system 1010 may load instructions from storage 1040 or another source (such as another computer system 1010) to memory 1030. Processor 1020 may then load the instructions from memory 1030 to an internal register or internal cache. To execute the instructions, processor 1020 may retrieve the instructions from the internal register or internal cache and decode them. During or after execution of the instructions, processor 1020 may write one or more results (which may be intermediate or final results) to the internal register or internal cache. Processor 1020 may then write one or more of those results to memory 1030. In particular embodiments, processor 1020 executes only instructions in one or more internal registers or internal caches or in memory 1030 (as opposed to storage 1040 or elsewhere) and operates only on data in one or more internal registers or internal caches or in memory 1030 (as opposed to storage 1040 or elsewhere). One or more memory buses (which may each include an address bus and a data bus) may couple processor 1020 to memory 1030. Bus 1070 may include one or more memory buses, as described in further detail below. In particular embodiments, one or more memory management units (MMUs) reside between processor 1020 and memory 1030 and facilitate accesses to memory 1030 requested by processor 1020. In particular embodiments, memory 1030 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1030 may include one or more memories 1030, where appropriate. Although this disclosure describes and illustrates particular memory, this disclosure contemplates any suitable memory.

In particular embodiments, storage 1040 includes mass storage for data or instructions. As an example and not by way of limitation, storage 1040 may include a hard disk drive (HDD), a floppy disk drive, flash memory, an optical disc, a magneto-optical disc, magnetic tape, or a Universal Serial Bus (USB) drive or a combination of two or more of these. Storage 1040 may include removable or non-removable (or fixed) media, where appropriate. Storage 1040 may be internal or external to computer system 1010, where appropriate. In particular embodiments, storage 1040 is non-volatile, solid-state memory. In particular embodiments, storage 1040 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1040 taking any suitable physical form. Storage 1040 may include one or more storage control units facilitating communication between processor 1020 and storage 1040, where appropriate. Where appropriate, storage 1040 may include one or more storages 1040. Although this disclosure describes and illustrates particular storage, this disclosure contemplates any suitable storage.

In particular embodiments, I/O interface 1050 includes hardware, software, or both, providing one or more interfaces for communication between computer system 1010 and one or more I/O devices. Computer system 1010 may include one or more of these I/O devices, where appropriate. One or more of these I/O devices may enable communication between a person and computer system 1010. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1050 for them. Where appropriate, I/O interface 1050 may include one or more device or software drivers enabling processor 1020 to drive one or more of these I/O devices. I/O interface 1050 may include one or more I/O interfaces 1050, where appropriate. Although this disclosure describes and illustrates a particular I/O interface, this disclosure contemplates any suitable I/O interface.

In particular embodiments, communication interface 2100 includes hardware, software, or both providing one or more interfaces for communication (such as, for example, packet-based communication) between computer system 1010 and one or more other computer systems 1010 or one or more networks. As an example and not by way of limitation, communication interface 2100 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 2100 for it. As an example and not by way of limitation, computer system 1010 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1010 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1010 may include any suitable communication interface 2100 for any of these networks, where appropriate. Communication interface 2100 may include one or more communication interfaces 2100, where appropriate. Although this disclosure describes and illustrates a particular communication interface, this disclosure contemplates any suitable communication interface.

In particular embodiments, bus 1070 includes hardware, software, or both coupling components of computer system 1010 to each other. As an example and not by way of limitation, bus 1070 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-Active pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1070 may include one or more buses 1070, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a vehicle:
   determining a first temperature of a control unit of the vehicle, wherein the control unit and one or more components of the vehicle are interconnected through a thermal network;
   determining a thermal objective for the control unit based on the first temperature of the control unit;
   selecting, based on the thermal objective for the control unit, at least a first component from the one or more components, wherein selecting at least the first component is based on a determination that the first component has a second temperature that is higher than the first temperature of the control unit; and
   sending one or more signals to one or more actuators within the thermal network to enable a heat-transfer fluid to flow between (1) a first portion of the thermal network thermally coupled to the control unit and (2) a second portion of the thermal network thermally coupled to the first component.

2. The method of claim 1, further comprising:
   determining one or more second temperatures associated with the one or more components of the vehicle, each of the one or more second temperatures being associated with one of the one or more components of the vehicle; and
   determining, for each of the one or more components, a thermal margin based on the second temperature associated with that component;
   wherein selecting at least the first component from the one or more components is based on the thermal margin of each of the one or more components.

3. The method of claim 1, wherein the thermal objective is to lower the first temperature of the control unit, wherein selecting at least the first component is based on a determination that the first component has a sufficient thermal margin by comparing a calculated thermal margin of that component against a threshold thermal margin.

4. The method of claim 3, wherein the one or more signals are configured to cause the heat-transfer fluid to flow from the first portion of the thermal network to the second portion of the thermal network.

5. The method of claim 1, wherein the thermal objective is to increase the first temperature of the control unit.

6. The method of claim 5, wherein the one or more signals are configured to cause the heat-transfer fluid to flow from the second portion of the thermal network to the first portion of the thermal network.

7. The method of claim 1, further comprising:
   selecting one or more thermal network elements, wherein the one or more thermal network elements are thermally coupled to the thermal network;
   wherein the one or more signals sent to the one or more actuators within the thermal network are configured to enable the heat-transfer fluid to flow through one or more portions of the thermal network thermally coupled to the one or more thermal network elements.

8. The method of claim 7, wherein the one or more thermal network elements include a radiator or a reservoir.

9. The method of claim 1, wherein selecting at least the first component is further based on flow rates associated with portions of the thermal network, power consumption associated with portions of the thermal network, or a combination thereof.

10. The method of claim 1, wherein selecting at least the first component is further based on flow rates associated with portions of the thermal network, power consumption of one or more thermal network elements, and clock speed of an Electronic Control Unit (ECU).

11. The method of claim 1, wherein the one or more components of the vehicle include an engine, a battery, or a heating, ventilation, and cooling system.

12. The method of claim 1, wherein determining the thermal objective is further based on a determination that the control unit is operating at a higher clock speed.

13. The method of claim 1, wherein the one or more actuators include a valve or a pump in the thermal network.

14. A system comprising: one or more processors and one or more computer-readable non-transitory storage media coupled to the one or more of the processors, the one or more computer-readable non-transitory storage media comprising instructions operable when executed by the one or more of the processors to cause the system to:
   determine a first temperature of a control unit of a vehicle, wherein the control unit and one or more components of the vehicle are interconnected through a thermal network;
   determine a thermal objective for the control unit based on the first temperature of the control unit;
   select, based on the thermal objective for the control unit, at least a first component from the one or more components, wherein the instructions to select include instructions select at least the first component based on a determination that the first component has a second temperature that is higher than the first temperature of the control unit; and
   send one or more signals to one or more actuators within the thermal network to enable a heat-transfer fluid to flow between (1) a first portion of the thermal network thermally coupled to the control unit and (2) a second portion of the thermal network thermally coupled to the first component.

15. The system of claim 14, wherein the one or more processors are further operable when executing the instructions to perform operations comprising:
   select one or more thermal network elements, wherein the one or more thermal network elements are thermally coupled to the thermal network;
   wherein the one or more signals to be sent to the one or more actuators within the thermal network are configured to enable the heat-transfer fluid to flow through one or more portions of the thermal network thermally coupled to the one or more thermal network elements.

16. The system of claim 14, wherein selecting at least the first component is further based on flow rates associated with portions of the thermal network.

17. The system of claim 14, wherein selecting at least the first component is further based on power consumption associated with portions of the thermal network.

18. The system of claim 14, wherein the one or more components of the vehicle include an engine, a battery, or a heating, ventilation, and cooling system.

19. One or more computer-readable non-transitory storage media embodying software that is operable when executed to cause one or more processors to perform operations comprising:
   determine a first temperature of a control unit of a vehicle, wherein the control unit and one or more components of the vehicle are interconnected through a thermal network;
   determine a thermal objective for the control unit based on the first temperature of the control unit;
   select, based on the thermal objective for the control unit, at least a first component from the one or more components, wherein selecting at least the first component based on a determination that the first component has a second temperature that is higher than the first temperature of the control unit; and
   send one or more signals to one or more actuators within the thermal network to enable a heat-transfer fluid to flow between (1) a first portion of the thermal network thermally coupled to the control unit and (2) a second portion of the thermal network thermally coupled to the first component.

20. The computer-readable non-transitory storage media of claim 19, wherein the software is further operable when executed to cause the one or more processors to perform operations comprising:
   select one or more thermal network elements, wherein the one or more thermal network elements are thermally coupled to the thermal network;
   wherein the one or more signals to be sent to the one or more actuators within the thermal network are configured to enable the heat-transfer fluid to flow through one or more portions of the thermal network thermally coupled to the one or more thermal network elements.

* * * * *